(12) United States Patent
Culbertson

(10) Patent No.: US 6,257,758 B1
(45) Date of Patent: Jul. 10, 2001

(54) SURFACE TEMPERATURE SENSOR

(75) Inventor: David P. Culbertson, Bristol, WI (US)

(73) Assignee: Claud S. Gordon Company, Richmond, IL (US)

( * ) Notice: Subject to any disclaimer, the term of this patent is extended or adjusted under 35 U.S.C. 154(b) by 0 days.

(21) Appl. No.: 09/169,323

(22) Filed: Oct. 9, 1998

(51) Int. Cl.[7] .............................. G01K 1/16; G01K 7/00; G01K 1/00
(52) U.S. Cl. ........................ 374/120; 374/179; 374/208
(58) Field of Search .................................. 374/208, 179, 374/165; 136/221, 230

(56) References Cited

U.S. PATENT DOCUMENTS

| | | | | |
|---|---|---|---|---|
| 2,288,510 | * | 6/1942 | Brannon | 219/448.16 |
| 2,764,663 | * | 9/1956 | Molyneaux | 219/494 |
| 2,806,122 | * | 9/1957 | Thunander | 219/448.14 |
| 2,934,957 | * | 5/1960 | Reinhart et al. | 236/20 A |
| 3,041,387 | | 6/1962 | Moeller | 136/221 |
| 3,153,139 | * | 10/1964 | Sivacek | 219/448.14 |
| 3,246,122 | * | 4/1966 | Wetzel | 219/448.14 |
| 3,573,995 | | 4/1971 | Senbokuya | 136/221 |
| 3,714,539 | * | 1/1973 | Hampl, Jr. | 136/221 |
| 3,751,305 | * | 8/1973 | Huebscher | 136/221 |
| 3,874,239 | | 4/1975 | Finney | 374/179 |
| 4,241,289 | * | 12/1980 | Bowling | 136/221 |
| 4,265,117 | * | 5/1981 | Thoma et al. | 136/221 |
| 4,279,154 | * | 7/1981 | Nakamura | 136/221 |
| 4,355,911 | | 10/1982 | Tymkewicz | 374/179 |
| 4,436,438 | | 3/1984 | Voznick | 374/165 |
| 4,438,290 | | 3/1984 | Wells, Jr. et al. | 136/221 |
| 4,454,370 | | 6/1984 | Voznick . | |
| 4,859,081 | * | 8/1989 | Kabayashi | 374/179 |
| 4,934,831 | * | 6/1990 | Volbrecht | 374/179 |
| 4,963,194 | * | 10/1990 | Mele | 136/221 |
| 5,030,294 | | 7/1991 | Burley | 136/230 |
| 5,176,451 | * | 1/1993 | Sasada et al. | 374/208 |
| 5,370,459 | * | 12/1994 | Culbertson et al. | 374/179 |
| 5,464,485 | | 11/1995 | Hall, Jr. | 374/179 |
| 5,618,109 | * | 4/1997 | Culbertson | 374/179 |
| 5,632,557 | * | 5/1997 | Simons | 374/208 |
| 5,746,513 | * | 5/1998 | Renken | 374/179 |
| 5,863,123 | * | 1/1999 | Lee | 374/179 |
| 6,127,915 | * | 10/2000 | Gam et al. | 374/208 |
| 6,190,038 | * | 2/2001 | Kita et al. | 374/179 |

FOREIGN PATENT DOCUMENTS

| | | | | |
|---|---|---|---|---|
| 4217389 | | 12/1993 | (DE) . | |
| 4244189 | | 7/1994 | (DE) . | |
| 29716885 | | 4/1998 | (DE) . | |
| 932260 | | 7/1963 | (GB) . | |
| 404310 | * | 12/1990 | (GB) | 374/179 |
| 301108 | * | 9/1965 | (NL) | 374/179 |
| WO 94/29682 | | 12/1994 | (WO) . | |

OTHER PUBLICATIONS

PCT Search Report for International Application No. PCT/US 99/23448, Jul. 10, 1999.

* cited by examiner

Primary Examiner—Diego Gutierrez
Assistant Examiner—Yaritza Guadalupe
(74) Attorney, Agent, or Firm—Renner, Otto, Boisselle & Sklar, LLP

(57) ABSTRACT

A surface temperature sensor includes a thermally conductive surface contact means for contacting a surface to be thermally measured and a coil. The coil contains an insulated thermal sensing element in thermal contact with the surface contact means and provides support for the surface contact means.

19 Claims, 3 Drawing Sheets

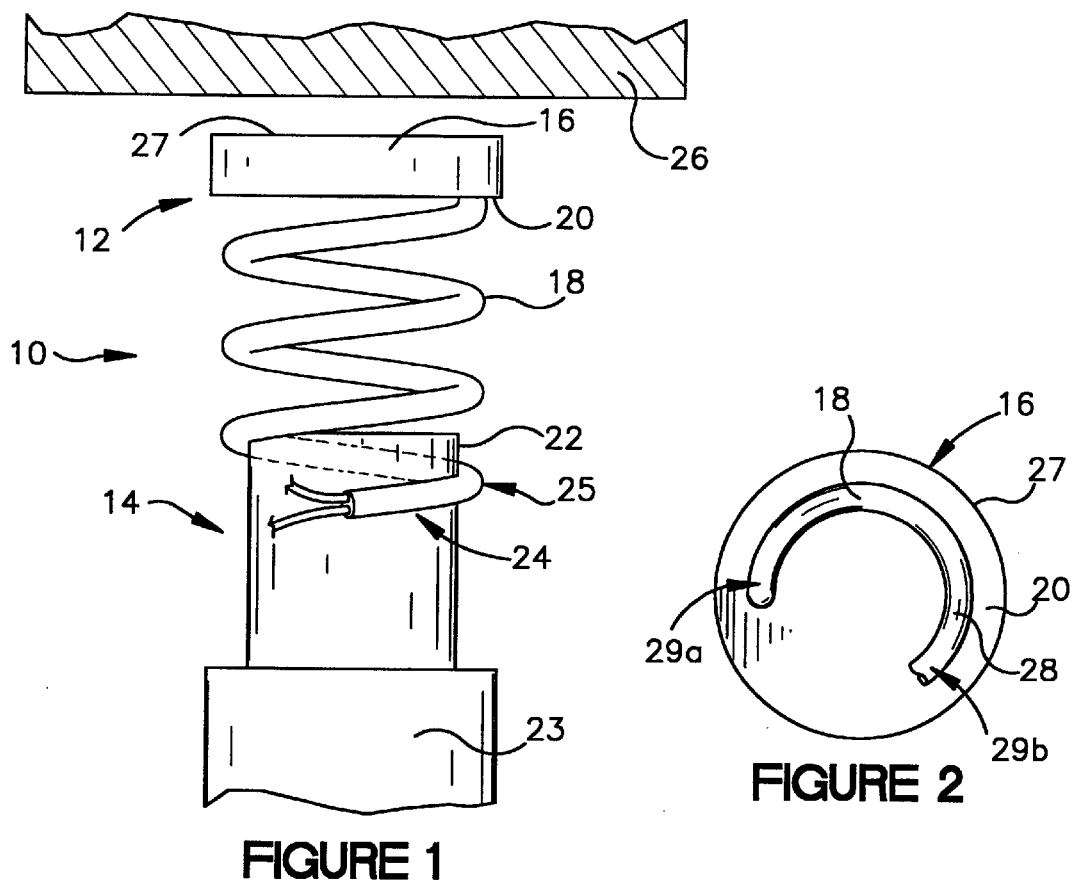
FIGURE 1
FIGURE 2
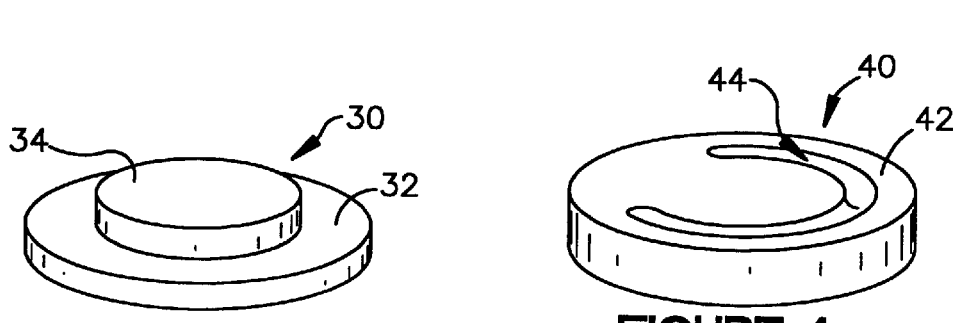
FIGURE 3a
FIGURE 4a
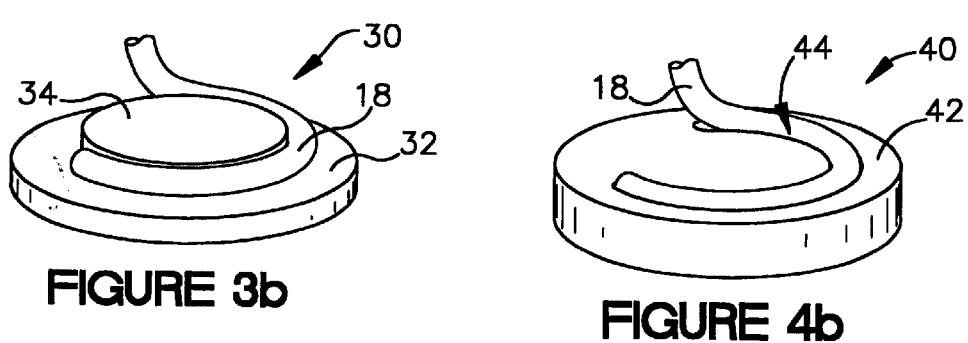
FIGURE 3b
FIGURE 4b

SURFACE TEMPERATURE SENSOR

TECHNICAL FIELD OF THE INVENTION

The present invention relates generally to a surface temperature sensor, and more particularly to a sensor having a thermally conducting surface supported by a coiled temperature sensing element.

BACKGROUND OF THE INVENTION

Surface temperature sensors are known in the art; contact-type surface temperature sensors are designed to make contact with a surface in order to measure the temperature of the surface. For example, U.S. Pat. No. 4,859,081 describes one type of surface temperature sensor which includes a thin plate spring with a thermocouple junction on a central portion thereof. The plate spring is fixed at both of its ends to a support member so that the plate spring projects semicircularly in side elevation to form a temperature sensing portion. The plate spring and the thermocouple junction are brought into contact with the surface to be measured and are pressed against the surface to flatten slightly the semicircular portion of the plate spring. As a result, part of the plate spring and the thermocouple junction are engaged closely in press contact with the surface to be measured.

GB Application No. 932,260 (Pearce) relates to another type of surface temperature sensor having a thermocouple ring supported by an insulated disk which in turn is supported by a coil consisting of one of the two thermocouple materials. The sensor is pressed against a surface to be measured, whereby the thermocouple ring makes direct contact to the surface. The thermocouple ring and the insulated disk arrangement is capable of travel in a direction perpendicular to the surface due to the coil. The amount of travel is limited by an outer casing which surrounds the thermocouple ring.

Another type of surface temperature sensor is disclosed in U.S. Pat. No. 4,454,370 (Voznick) which shows a pair of side-by-side elongated coils that come into contact with one another at their ends to form a thermocouple junction. The surface temperature sensor further includes a protective sleeve supported by a coil which engages the surface to be measured prior to the thermocouple junction in order to ensure a safe rate of contact and thereby protect the thermocouple from damage. Once in contact with the surface, the thermocouple junction is further operable to move in a direction perpendicular to the surface via its secondary coils to make a direct press contact with the surface.

There are several drawbacks associated with the conventional contact-type surface temperature sensors enumerated above. In each of the above sensors, the thermocouple junction makes contact directly with the surface to be measured. When using conventional lap joints for thermocouples, wherein one of the thermocouple materials overlap the other to form the thermocouple junction, the lap joint prevents the junction from uniformly contacting the surface to be measured, thereby introducing a measurement error. Alternatively, when using a conventional butt joint to form the thermocouple junction, sputtering, flash, etc. can produce a buildup at the joint or a nonuniformity, such as a burr, may form on the surface and prevent the thermocouple junction from uniformly engaging the surface to be measured. Such direct contact of the thermocouple junction to the surface to be measured results in substantial thermal contact resistance. Any such contact resistance is in series with other thermal resistance and undesirably reduces the heat transfer between the surface to be measured and the sensor.

Another drawback associated with conventional surface temperature sensors is the use of an electrical insulating layer between the thermocouple junction and the junction holding apparatus. The insulating layer, although electrically insulating, contains a substantial thermal mass and thereby provides a thermal loading effect on the thermocouple junction, thereby resulting in thermal measurement error and a slow response time which thus requires contact with the surface to be measured to be maintained for an undesirably long period of time to ensure an accurate thermal measurement.

Yet another disadvantage associated with the conventional contact-type surface temperature sensors is the excessive thermal loading due to the travel stop. Such prior art protection includes semicircular housing walls which substantially encircle the thermocouple junction. The housing walls limit the distance the resilient thermocouple junction can be deflected when pressed against a large surface. The housing walls come in contact with the surface to be measured and, due to the substantial thermal mass of the housing walls, may modify the surface temperature. Therefore such prior art designs are undesirable because the housing walls may cause measurement error.

In view of the above shortcomings associated with convention contact-type surface temperature sensors, there is a need in the art for a rugged surface temperature sensor which reduces heat transfer errors and provides for miniaturization.

SUMMARY OF THE INVENTION

The present invention relates to a contact-type surface temperature sensor for measuring the temperature of a surface. The sensor includes a thermally conductive surface contact member which engages a surface to be measured. The contact member is supported by a coil having thermal sensing elements therein which form a thermocouple junction. The sensor of the present invention, by incorporating the thermal sensing elements within the coil, allows for the miniaturization of the sensor.

Use of the thermally conductive contact member serves to help protect the thermocouple junction and eliminates a need for prior art protective housings, thus reducing the thermal loading of the sensor and reducing measurement errors associated therewith. In addition, since the sensor does not incorporate an insulative disk, but rather is supported primarily or entirely by the coil, measurement error due to thermal loading and heat transfer is further reduced over the prior art.

According to one aspect of the present invention, the thermally conductive surface contact member is stepped or recessed, respectively, along a bottom surface thereof to facilitate the engagement of the coil to the surface contact member. Consequently, the coil can be secured to the contact member for improved ruggedness. In addition, the gradual exit of the coil from the contact member reduces heat transfer errors due to thermal shunting. Since thermal shunting is a function of the thermal gradient at the sensor, the gradual exit of the coil isolates the thermal shunting from the thermocouple junction by causing the thermal gradient to exist along the coil at a distance away from the thermocouple junction.

According to another aspect of the present invention, the sensor includes a base portion to which the coil attaches. The base portion includes a support member, about which one or more turns of the coil may attach, which provides additional support to the coil for improved ruggedness and durability. The support member may further include an over travel protection member extending from the support member toward the contact member. The over travel protection member advantageously protects the sensor even in instances where a small object or surface is to be measured in contrast to prior art sensors which only provide protection as a travel stop in instances where the object to be measured is larger than the sensor diameter.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 1 is a side view of a contact-type surface temperature sensor according to the present invention;

FIG. 2 is a plan view of a bottom surface portion of a conductive disk according to the present invention;

FIGS. 3a and 3b are perspective views of a bottom surface portion of a conductive disk having a stepped portion according to the present invention;

FIGS. 4a and 4b are perspective views of an alternative bottom surface portion of a conductive disk having a recessed portion according to the present invention;

DESCRIPTION OF THE PREFERRED EMBODIMENTS

Figures 5A, 5B, 5C:
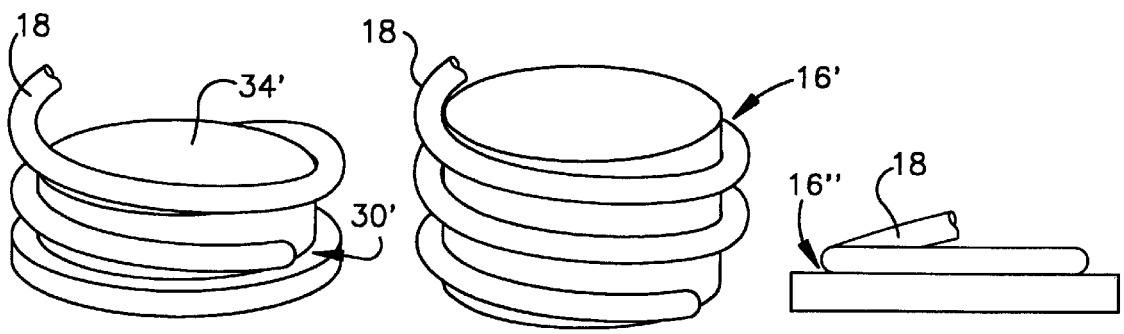
FIGS. 5a–5c are perspective views and a side view, respectively, illustrating alternative contact methodologies for coupling the coil to the surface contact member according to the present invention.

The surface temperature sensor of the present invention will now be described with reference to the drawings, wherein like reference numerals refer to like elements throughout. The present invention is directed toward a surface temperature sensor which includes a thermally conductive contact member such as a conductive disk which engages the surface to be measured. The sensor supports the contact member with a coil which also houses thermal sensing elements such as thermocouple wires which sense the temperature at the contact member. The use of the coil as the primary or only support mechanism advantageously allows flexibility in manipulating the contact member to engage the surface to be measured. Furthermore, the coil which acts as the primary support mechanism facilitates the miniaturization of the sensor, thereby increasing the number of applications in which the sensor can be utilized.

In addition to the above advantages, having the coil as the primary support for the contact member, as opposed to prior art sensors which incorporated insulating disks, etc., provides a substantial reduction in heat transfer error since the cross-sectional area of the coil is not substantial which minimizes thermal loading. Furthermore, the coil gradually exits a surface of the thermally conductive contact member which substantially eliminates heat transfer error due to thermal shunting. The gradual exit of the coil from the contact member results in a substantial portion of the coil being in thermal contact with the contact member which thus isolates the thermocouple junction from a thermal gradient (which causes the thermal shunting) along the coil. Consequently, the present invention provides further performance improvements over the prior art.

The coil containing the thermal sensing elements couple the contact member to a base portion which provides structural support for the coil. The base portion preferably includes a support member about which a portion of the coil (e.g., one or more turns) is engaged to provide additional structural support for the sensor. In addition, or in the alternative, the base portion includes an over travel protection member which extends toward the contact member through the concentric coil. The over travel protection member provides protection for the sensor and particularly the coil by setting a maximum deflection beyond which the coil will not contract, thereby preventing the coil from being damaged.

Referring to FIG. 1, a surface temperature sensor 10 is provided. The surface temperature sensor 10 includes a surface contact portion 12 and a base portion 14. The surface contact portion 12 includes a thermally conductive contact member 16, preferably a disk, which is coupled to a coil 18 having thermal sensing elements 24 such as thermocouple wires provided therein. The coil 18 is joined to a bottom surface 20 of the contact member 16. The coupling mechanism by which the coil 18 and the contact member 16 are engaged is achieved using, for example, a thermally conductive adhesive such as a glue, resin, puddy or solder or by other functionally equivalent means which places the coil 18 and the contact member 16 in thermal communication with one another. For example, the coil 18 may be brazed, welded, mechanically fastened, crimped or staked to effectuate the engagement with the contact member 16. Any such attachment mechanism is contemplated as falling within the scope of the present invention. In addition, although the thermally conductive contact member 16 may be electrically conductive, the contact member 16 may alternatively be electrically insulative.

The base portion 14 includes, for example, a sensor handle 23 coupled to an extended member which serves as a connection surface 22. An end turn 25 of the coil 18 is partially wrapped around and joined to the connection surface 22 and the diameter of the connection surface 22 is preferably similar to the inner diameter of the coil 18 to facilitate a secure interference or friction fit between the connection surface 22 and the coil 18. Alternatively, the coil 18 may be clamped through a hole in a flange or may fit into a slit, etc. Any structure or mechanism by which the coil 18 is secured to the connection surface 22 may be utilized and is contemplated as falling within the scope of the present invention. The terminating leads of the sensing elements 24 exit the coil 18 at one end and are connected to an electrical measuring device such as a voltage meter (not shown) or the like. Although a handle 23 is illustrated in FIG. 1, a handle 23 is not necessary and various support structures or mechanisms may be utilized, many of which may not be hand-held. Any such structure which couples to the coil 18 and provides support to the coil 18 is contemplated as falling within the scope of the present invention.

The other terminating leads of the coil 18 make contact with one another at the end of the coil 18 to form a thermocouple junction preferably within the coil 18. A temperature of the subject surface 26 is then measured by pressing the thermally conductive contact member 16 against the surface 26 so as to thermally engage the surface 26. Alternatively, however, the thermocouple junction may be an exposed junction and exist outside the coil 18. In such a case, the thermocouple wires may be directly connected together to form the thermocouple junction or, alternatively, if the contact member 16 is electrically conductive, the thermocouple junction may be formed via the electrical contact through the contact member 16. Such an alternative embodiment is not the preferred embodiment, however, since such a configuration will not fully isolate the thermal shunting effect from the thermocouple junction.

According to one exemplary embodiment of the present invention, the contact member 16 (such as the disk illustrated in FIG. 1) is formed of a thermally conductive material, for example, a metal such as copper, aluminum, silver, etc., a metal alloy or a ceramic such as aluminum nitride. Any thermally conductive material may be utilized and is contemplated as falling within the scope of the present invention. The preferred shape of the contact member 16 is cylindrical, however, the contact member 16 may have other cross-sectional shapes such as a square, an oval, etc. as may be desired and any shape contact member 16 is contemplated as falling within the scope of the present invention.

Preferably, the height or thickness of the disk 16 is substantially less than its surface diameter to minimize its thermal mass. A top surface 27 of the disk (which comes into contact with the surface to be measured 26) is preferably flat, uniform, and smooth to ensure maximum physical and thermal contact between the two surfaces. Alternatively, however, a non-planar contact member 16 may be utilized to engage a non-planar surface to be measured, as may be desired. In addition, the surface area of the contact member 16 is preferably larger than the thermocouple junction within the coil 18 in order to increase the ratio of heat input to heat output by gathering the heat from a substantial area of the surface to be measured.

According to the present invention, the contact member 16 having the thermocouple junction formed on the bottom surface 20 thereof, instead of directly contacting the thermocouple junction to the surface 26 to be measured, protects the thermocouple junction from damage and thereby improves the ruggedness, durability and reliability of the surface temperature sensor 10. In addition, because the thermocouple junction does not directly contact the surface to be measured 26, but rather contacts a highly thermally conductive contact member 16 which contacts the surface 26, the sensor 10 is less susceptible to contact resistance. In the prior art, small variations in the angles of alignment and the straightness of the thermocouple junction area cause large variations in the thermal contact resistance and the contact area between the thermocouple junction and the surface 26. The contact member 16 of the present invention self-aligns with the surface 26 and substantially reduces the susceptibility to contact resistance over the prior art due to its high thermal conductivity.

The coil 18, as illustrated in FIG. 1, may be composed of numerous electrically insulating materials. One exemplary material is a metal sheathed mineral insulated (MSMI) cable such as XACTPAK® manufactured by Watlow Gordon. The MSMI cable includes electrically insulated thermocouple wires which are connected together to form a hot junction for measuring the surface temperature. The thermocouple junction is preferably formed within the MSMI cable, which forms the coil 18 and is coupled to the bottom surface 20 of the contact member 16. Alternatively, a tubing having insulated thermocouple wires inserted therein may be utilized. Any such insulated coil material or configuration may be used and is contemplated as falling within the scope of the present invention. In any case, the coil 18 is formed to provide a desired degree of resiliency for a given application.

As is well known by those skilled in the art, the resiliency (or the stiffness) of the coil 18 is dictated by the coil's spring constant which is inversely proportional to the number of coils. Therefore, for a given coil material such as the MSMI, the resiliency of the coil 18 may be customized by increasing the number of coils. Alternatively, or additionally, the resiliency of the coil 18 may be customized by varying the material used to form the coil 18 or alternatively the coil diameter or the diameter of the MSMI cable, etc., may be varied to adjust the coil resiliency. The outside sheath of the coil 18 is preferably a metal material to aid in the coil resiliency, however, the conductive wires therein are electrically insulated from one another and any electrically insulative material may be utilized within the coil 18 and such material is contemplated as falling within the scope of the present invention. Preferably, the coil 18 is sufficiently resilient to easily self-align the contact member 16 with the surface 26 (e.g., by tilting the contact member or disk 16 into flush contact with the surface to be measured 26) to effectuate an accurate thermal measurement of the surface 26.

According to a preferred embodiment of the present invention, the coil 18 is circularly helical, as illustrated in FIG. 1. Alternatively, the coil 18 may be formed in a variety of shapes such as a square helical coil, a triangular helical coil, or a reversing coil. Furthermore, any resiliently biased structure or mechanism may be utilized as the coil 18 and such a structure is contemplated as falling within the scope of the present invention.

The thermal sensing elements 24 (e.g., thermocouple wires), are preferably round wires, but may alternatively comprise ribbon materials such as type K, E, J, N and T materials. It will be appreciated, however, that other materials and other material configurations can also be used and any such thermal sensing material may be used and is contemplated as falling within the scope of the present invention.

Referring now to FIG. 2, the bottom surface 20 of the conductive disk 16 is illustrated along with a portion of the last turn of the coil 18 that is joined to the disk 16. Consequently, the diameter of the disk 16 is preferably the same size or larger than the diameter of the coil 18 for facilitating the connection. According to a preferred embodiment of the present invention, the coil 18 gradually exits the contact member 16. Another way of characterizing this feature is to say that a substantial portion or length 28 of the coil 18 contacts the contact member 16 before separating therefrom. This feature substantially reduces measurement error due to heat transfer by isolating the thermocouple junction from the thermal shunting effect as will be described in greater detail below.

Thermal shunting is relevant to the present invention in two ways. First, thermal shunting occurs generally along thermocouple wires in conventional sensors which form the thermocouple junction. Because the wires are typically at a temperature which differ from the surface to be measured, heat transfer occurs to or from the thermocouple wires via the sensor tip (depending upon which is at a higher temperature, the wires or the surface to be measured). Depending on the geometry of the sensor, the heat transfer may not allow the sensor tip to reach the temperature of the surface which is to be measured, thus resulting in a measurement error. Such error may be significant, easily being up to 30% of the temperature difference or gradient between the surface to the measured and the ambient temperature. Secondly, when measuring a surface that itself has a small thermal mass or low thermal conductivity, the thermal shunting effect may significantly alter the temperature of the surface to be measured.

The present invention isolates the thermal shunting effect from the thermocouple junction by having a substantial portion or length 28 of the coil 18 in contact with the contact member 16 prior to exiting therefrom. Consequently, the thermocouple junction, which is within the coil 18 at or near an end point or portion 29a is an appreciable distance away from a point 29b at which the coil 18 exits the contact member 16. Thus the thermocouple junction at point 29a is at the temperature of the thermally conductive contact member 16 and the temperature gradient at point 29b along the coil 18 will be away from the thermocouple junction or tip. Since the heat transfer due to thermal shunting will occur at the point 29b which is a significant length 28 of the coil 18, the thermocouple junction is substantially isolated from the thermal shunting and heat transfer error is substantially reduced.

The length of the coil portion 28 may vary depending upon the size of the sensor 10 and its various components. According to a preferred embodiment of the present invention, the length 28 is sufficiently long to make the temperature at the thermocouple junction substantially the same temperature as the contact member 16. Consequently, the gradient along the coil 18 will not substantially influence the thermocouple within the coil 18, thus substantially isolating the thermocouple from the thermal shunting effect.

In addition, by using a coil spring configuration as illustrated, the structure which contacts the contact member 16 is typically only the coil 18. Because the cross sectional area of the coil 18 is substantially small, its thermal mass and thus its thermal loading is also small, thereby further reducing the thermal shunting. The coil 18 thus provides a rugged support for the contact member 16 while simultaneously exhibiting the small thermal loading.

FIGS. 3a and 3b illustrate a surface contact member 30 according to an exemplary embodiment of the present invention. The contact member 30 is preferably a thermally conductive disk which includes a bottom surface 32 of the disk 30 and a stepped portion 34, wherein the stepped portion 34 is used as an engagement surface to join the coil 18 to the conductive disk 30. As illustrated in FIG. 3b, a portion of the end turn of the coil 18 is wrapped around the stepped portion 34 and is coupled thereto. The stepped portion 34 is preferably smaller in diameter than the disk 32 and the thickness or height of the stepped portion 34 is preferably at least equal to half the thickness of the coil 18. As discussed above and as illustrated in FIG. 3b, a substantial portion of the coil 18 is in contact with the stepped portion 34 which provides a reduction in measurement error due to thermal transfer.

FIGS. 4a and 4b illustrate yet another exemplary surface contact member 40 according to the present invention. The surface contact member 40 (e.g., a thermally conductive disk) has a bottom surface 42 having a recessed portion 44 formed therein as an engagement surface. The recessed portion 44 preferably is approximately the size of the diameter of the coil 18 and operates to secure the coil 18 to the contact member or disk 40. The size and length of the recessed portion 44 may vary as may be desired. Preferably, however, the length of the recessed portion 44 is sufficiently long to allow a substantial portion of the coil 18 to recess therein, thereby isolating the thermocouple junction from thermal shunting as discussed above.

As illustrated above in conjunction with FIGS. 3a–3b and 4a–4b, the coupling between the coil 18 and the thermally conductive surface contact member 16 may be accomplished through a variety of means. FIGS. 5a–5c illustrate additional exemplary embodiments of the present invention, wherein the coil 18 is coupled to the contact member. As illustrated in FIG. 5a, a surface contact member 30' has a stepped portion 34' which is thicker than the stepped portion 34 of FIGS. 3a and 3b. Having a thicker stepped portion 34' is advantageous because additional turns of the coil 18 may be attached thereto which further reduces the thermal shunting effect and eases the manufacture of the sensor 10 because the coil 18 does not have to be situated onto the stepped portion 34' with as high a precision as the stepped portion 34.

FIG. 5b illustrates another exemplary embodiment of the present invention having a surface contact member 16' which may facilitate a further miniaturization of the sensor 10. The contact member 16' does not include a stepped portion and has a shape and size which engages an inside diameter of the coil 18. Lastly, FIG. 5c illustrates a contact member 16" that is neither stepped or recessed, but rather merely accommodates a length of the coil 18 which is secured to the contact member 16" by, for example, a braze joint, an adhesive, a fastener, etc.

Figure 6A:
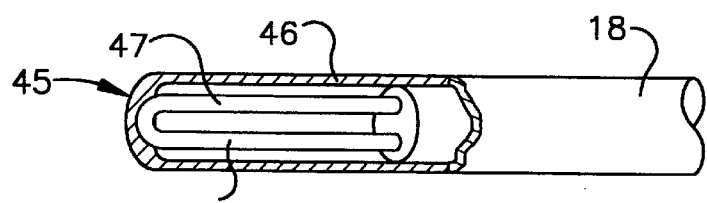
FIGS. 6a–6d are side cut-away views illustrating various types of thermocouple junctions according to the present invention.
Figure 6B:
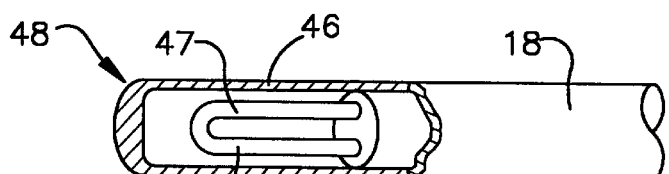
Figure 6C:
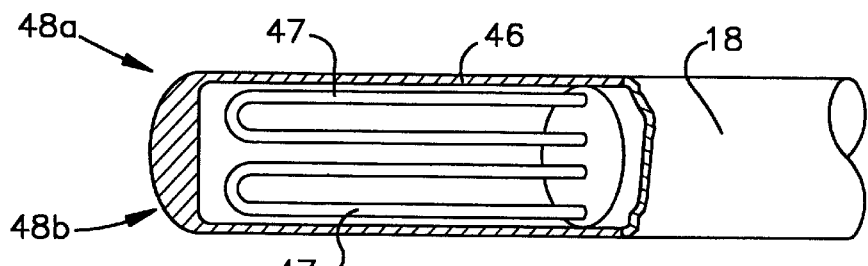
Figure 6D:
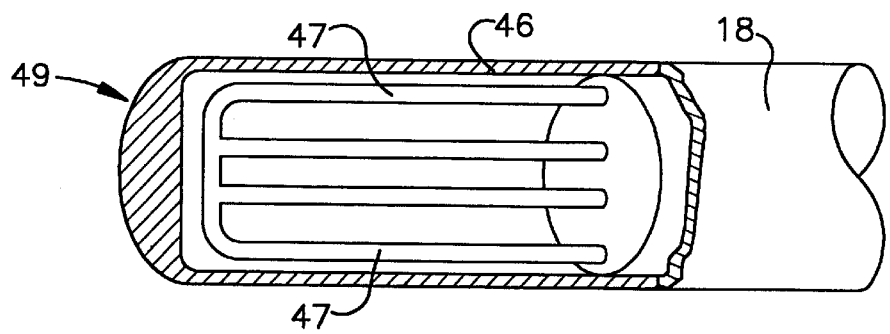

As discussed above, the thermocouple junction is preferably formed within the coil 18 such as the MSMI cable. A variety of different thermocouple junctions or thermocouple arrangements may be formed within the coil 18 and each such arrangement is contemplated as falling within the scope of the present invention. FIGS. 6a–6d illustrate exemplary thermocouple junction arrangements according to the present invention. A grounded junction type thermocouple 45 is illustrated in FIG. 6a. In a grounded thermocouple junction 45, a sheath 46 of the coil 18 is welded or otherwise joined together with the conductors 47 to form an integrally sealed junction 45. In FIG. 6b, an ungrounded junction 48 is insulated from the sheath 46 and is often used in applications where stray EMF may affect the temperature reading. In addition, as illustrated in FIG. 6c, multiple ungrounded thermocouple junctions 48a and 48b may be employed within the sheath 46 so that the coil 18 provides inherent redundancy which may be desirable or required in various applications. Lastly, as illustrated in FIG. 6d, a dual common type thermocouple junction 49 may be provided, wherein the conductors 47 are welded together for either grounded or ungrounded thermocouple applications.

Figure 7:
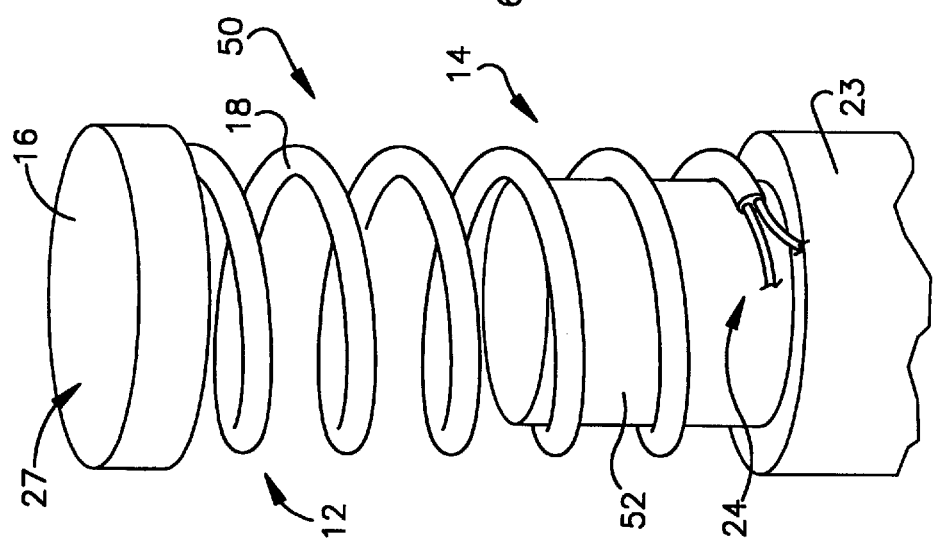
FIG. 7 is a side perspective view of another contact-type temperature sensor according to the present invention.

FIG. 7 illustrates a surface temperature sensor 50 according to another exemplary embodiment of the present invention. The sensor 50 is substantially similar to the sensor 10 of FIG. 1. The sensor 50, however, includes a support member 52 at the base portion 14, wherein the coil 18 is further secured to the base portion 14 by wrapping several of the end turns around the support member 52. The support member 52 provides extra support, durability and ruggedness to the sensor 50 which may be desirable in various applications, for example, high vibration environments requiring thermal measurements, such as industrial machinery. Other types of additional securing or anchoring mechanisms may alternatively be used to secure the coil 18 and any such mechanisms are contemplated as falling within the scope of the present invention. For example, the support member 52 may be a hollow tube, wherein the outside diameter of the coil 18 engages an inside diameter of the tube to form an interference fit.

Figure 8:
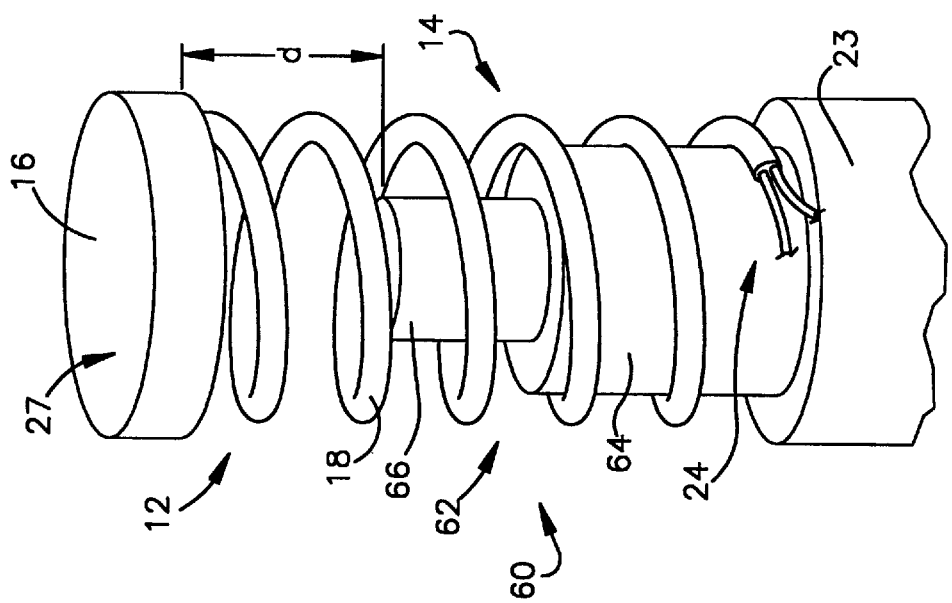
FIG. 8 is a side perspective view of yet another contact-type temperature sensor according to the present invention.

FIG. 8 reveals another exemplary embodiment of the present invention wherein a sensor 60 includes the surface contact portion 12 and the base portion 14. The base portion 14 includes the sensor handle 23 and the support member 62, and the support member 62 further includes a contacting base portion 64, which operates in a manner similar to the support member 52 of FIG. 5, and an over-travel protection member 66. The over-travel protection member 66 is preferably a stepped portion of the contacting base portion 64 which preferably is smaller in diameter than the contacting base portion 64 and extends toward the thermally conductive disk 16 through the concentric region formed by the coil 18. The coil 18 is joined to the base portion 14 by wrapping some of the end turns around the contacting base portion 64. The conductive disk 16 is physically supported by the coil 18 and the over-travel protection member 66 prevents damage to the coil 18 such as a permanent coil deformation by limiting the range of the coil's 18 compression to the distance "d".

Figure 9:
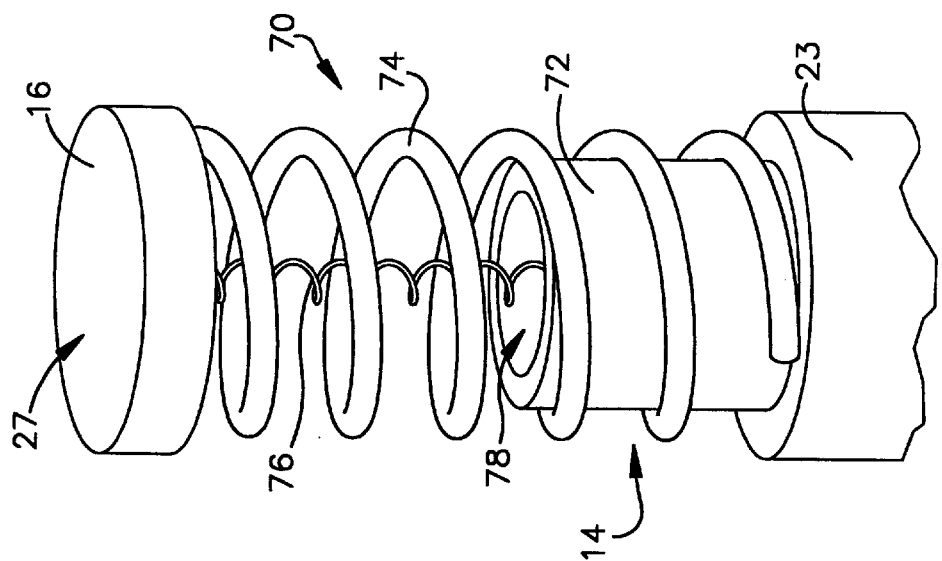
FIG. 9 is a side perspective view of still another contact-type temperature sensor according to the present invention.

Still another exemplary surface temperature sensor 70 according to the present invention is shown in FIG. 9. In the sensor 70, a coiled support element 74 replaces the coil 18 of FIGS. 1–8. Unlike the coil 18, the coiled support element 74 does not carry the thermal sensing elements. This allows for the further customization of the coiled support element 74 to provide the desired strength and flexure. The base portion 14 comprises the handle 23 and a tubular support member 72 which includes a hollow portion 78 therein. The hollow portion 78 is preferably cylindrical and concentric with the handle 23 and the tubular support member 74. On one side, the terminating ends of a pair sensing elements 76 are coupled to the conductive disk 16 while at the other end inside the hollow cylinder 78, the thermal sensing elements 76 exit the bottom portion of the sensor 70 and preferably feed into the handle 23 for connection to electrical conversion circuitry (not shown). Alternatively, the element 76 of the sensor 70 may consist of a single thermocouple wire while another thermocouple wire is formed within the coil 18.

The present invention has been discussed above in a preferred embodiment with the thermal sensing element being a thermocouple type sensor. Alternatively, however, other types of thermal sensing devices may be utilized and are contemplated as falling within the scope of the present invention. For example, a resistive temperature device (RTD) or a thermistor may be used. In such alternative embodiments, the conductive wires within the coil 18 may be considered a part or component of the thermal sensing element.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A surface temperature sensor, comprising:
    a thermally conductive surface contact member for contacting a surface to be thermally measured; and
    a coil containing and carrying an insulated thermal sensing element in thermal contact with the surface contact member,
    wherein the coil provides support for the surface contact member; and
    wherein a substantial portion of the coil is in thermal contact with the surface contact member such that the thermal sensing element is substantially isolated from a thermal gradient along the coil thereby substantially eliminating heat transfer error due to thermal shunting.

2. The surface temperature sensor of claim 1, wherein the surface contact member comprises a thermally conductive disk.

3. The surface temperature sensor of claim 1, wherein the coil is coupled to the surface contact member with a thermal conductive adhesive and wherein the thermally conductive adhesive includes one of a glue, a resin, puddy or solder.

4. The surface temperature sensor of claim 1, wherein the coil is crimped or staked to the surface contact member.

5. The surface temperature sensor of claim 1, wherein the surface contact member has a bottom portion having an engagement surface for coupling to the coil.

6. The surface temperature sensor of claim 5, wherein the engagement surface is one of a stepped surface on the bottom portion or a recess in the bottom portion.

7. The surface temperature sensor of claim 1, further comprising a support member, wherein another end of the coil is attached to the support member.

8. The surface temperature sensor of claim 7, wherein one or more turns of the coil engage the support member.

9. The surface temperature sensor of claim 7, further comprising an over travel protection member coupled to the support member and extending toward the surface contact means for protecting the coil from damage due to over travel of the surface contact means toward the support member.

10. The surface temperature sensor of claim 7, wherein the over travel protection member extends toward the surface contact means within a concentric region formed by the coil.

11. The surface temperature sensor of claim 1, wherein the thermal sensing element comprises a thermocouple sensor having an arrangement including one of a grounded thermocouple junction, an ungrounded thermocouple junction, multiple ungrounded thermocouple junctions, multiple common type thermocouple junctions and an exposed thermocouple junction.

12. A surface temperature sensor, comprising:
    a thermally conductive surface contact member for contacting a surface to be thermally measured; and
    a coil containing an insulated thermal sensing element in thermal contact with the surface contact member, and wherein the coil provides support for the surface contact member;
    wherein the thermal sensing element comprises a pair of thermocouple wires forming a thermocouple junction at an end portion of the coil which is in thermal contact with the contact member.

13. The surface temperature sensor of claim 12, wherein the coil gradually exits the contact member, thereby substantially isolating the thermocouple junction from a thermal shunting effect.

14. The surface temperature sensor of claim 12, wherein the coil has a portion in contact with the contact member, this portion having a sufficient length to insure that the temperature at the thermocouple junction is substantially equal to the temperature of the contact member thereby substantially isolating the thermocouple junction from a thermal shunting effect.

15. A surface temperature sensor, comprising:

a thermally conductive surface contact member for contacting a surface to be thermally measured; and a coil containing an insulated thermal sensing element in thermal contact with the surface contact member, and wherein the coil provides support for the surface contact member;

wherein the coil is coupled to the surface contact member with a thermally conductive adhesive, a weld, a braze joint, or a fastener.

16. A surface temperature sensor, comprising:

a thermally conductive surface contact member for contacting a surface to be thermally measured; and a pair of thermocouple wires forming a thermocouple junction which is in thermal contact with the contact member;

a coil incorporating at least one of the thermocouple wires whereby at least one of the pair of thermocouple wires is coiled in the same shape as the coil;

wherein the coil is the primary support for the surface contact member.

17. The surface temperature sensor of claim 16, wherein the coil incorporates both of the pair of thermocouple wires whereby both of the wires are coiled in the same shape as the coil.

18. The surface temperature sensor of claim 16, wherein the thermocouple junction is formed at an end of the coil which is in thermal contact with the contact member.

19. The surface temperature sensor of claim 18, wherein the coil has an end portion in contact with the contact member, this portion having a sufficient length to insure that the temperature at the thermocouple junction is substantially equal to the temperature of the contact member thereby substantially isolating the thermocouple junction from a thermal shunting effect.

* * * * *